United States Patent
Kojima

(10) Patent No.: US 8,246,022 B2
(45) Date of Patent: Aug. 21, 2012

(54) VIBRATION-PROOFING DEVICE

(75) Inventor: Hiroshi Kojima, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 372 days.

(21) Appl. No.: 12/529,432

(22) PCT Filed: Mar. 12, 2008

(86) PCT No.: PCT/JP2008/054494
§ 371 (c)(1),
(2), (4) Date: Sep. 1, 2009

(87) PCT Pub. No.: WO2008/111610
PCT Pub. Date: Sep. 18, 2008

(65) Prior Publication Data
US 2010/0096787 A1    Apr. 22, 2010

(30) Foreign Application Priority Data
Mar. 12, 2007  (JP) .................. 2007-061638

(51) Int. Cl.
*F16F 5/00* (2006.01)
*F16M 5/00* (2006.01)

(52) U.S. Cl. .................. 267/140.13; 267/293

(58) Field of Classification Search ............ 267/140.13, 267/140.14, 140.15, 292, 293
See application file for complete search history.

(56) References Cited

U.S. PATENT DOCUMENTS

| | | | | |
|---|---|---|---|---|
| 4,741,521 A | * | 5/1988 | Schiffner et al. | 267/140.12 |
| 5,183,243 A | * | 2/1993 | Matsumoto | 267/140.13 |
| 5,547,172 A | * | 8/1996 | Corcoran | 267/140.13 |
| 7,293,755 B2 | * | 11/2007 | Miyahara et al. | 267/140.13 |
| 2002/0038862 A1 | | 4/2002 | Hildebrandt et al. | |
| 2002/0053764 A1 | * | 5/2002 | Goto et al. | 267/140.14 |
| 2005/0206056 A1 | * | 9/2005 | Maeno et al. | 267/140.13 |

FOREIGN PATENT DOCUMENTS

| | | | |
|---|---|---|---|
| JP | 59-190530 A | | 10/1984 |
| JP | 01320331 A | * | 12/1989 |
| JP | 09-089037 A | | 3/1997 |
| JP | 11-210808 A | | 8/1999 |
| JP | 2001-173712 A | | 6/2001 |
| JP | 2005-249063 A | | 9/2005 |
| WO | 2005/015048 A2 | | 2/2005 |

OTHER PUBLICATIONS

European Search Report issued Jul. 5, 2012 for corresponding Application No. 08721910.1.

* cited by examiner

*Primary Examiner* — Thomas J Williams
(74) *Attorney, Agent, or Firm* — Sughrue Mion, PLLC

(57) ABSTRACT

This vibration-proofing device is a vibration-proofing device 12 including an elastic body 28 which elastically connects an intermediate cylinder fitting 130 and an inner cylinder fitting 20, a first liquid chamber 161 and a second liquid chamber 162 disposed around the central axis of the inner cylinder fitting 20, and a partition wall 29 made of the elastic body 28, which is disposed between the adjacent liquid chambers 161 and 162. The initial load is input in a +Z-direction substantially parallel to the central axis of the intermediate cylinder fitting 130. When the inner cylinder fitting 20 has been displaced in the –Z-direction, a displacement regulating member 71 which abuts a formation area of the partition wall 29 in the elastic body 28 to regulate the displacement of the elastic body 28 is connected to the intermediate cylinder fitting 130. It is thus possible to regulate the displacement of the elastic body at low cost.

2 Claims, 5 Drawing Sheets

VIBRATION-PROOFING DEVICE

TECHNICAL FIELD

The present invention relates to a vibration-proofing device.

Priority is claimed on Japanese Patent Application No. 2007-061638, filed Mar. 12, 2007, the content of which is incorporated herein by reference.

BACKGROUND ART

An engine mount is disposed as a vibration-proofing device between an engine which is a vibration generating portion of a vehicle, and a vehicle body which is a vibration receiving portion. The engine mount restrains the vibration of the engine from being transmitted to the vehicle body.

FIG. 5 is a sectional view of an engine mount according to a conventional technique. In FIG. 5, a downward direction (initial load direction) parallel to the central axis of the engine mount 8 is defined as a +Z-direction. The engine mount 8 includes an inner cylinder fitting 20 connected to the engine side, an outer cylinder fitting 30 connected to the vehicle body side, and a rubber elastic body 28 which connects the inner cylinder fitting 20 and the outer cylinder fitting 30. The initial load of the engine is input to the inner cylinder fitting 20 in the +Z-direction substantially parallel to the central axis of the inner cylinder fitting 30.

Meanwhile, when the inner cylinder fitting 20 is displaced in an opposite direction (-Z-direction) to the input direction of the initial load with the displacement of the engine, a large tensile stress acts on the rubber elastic body 28. This degrades the durability performance of the rubber elastic body.

Thus, in order to regulate the displacement of the inner cylinder fitting 20 in the opposite direction (-Z-direction or rebound direction) to the input direction of the initial load, a rebound stopper mechanism 170 is suggested (for example, refer to Patent Document 1). The rebound stopper mechanism 170 regulates the displacement of the inner cylinder fitting 20 by extending the rubber elastic body 28 to form a rubber stopper 176, connecting a displacement regulating member (stopper fitting) 171 to the outer cylinder fitting 30, and making the rubber stopper 176 abut on the displacement regulating member 171. In this technique, the displacement of the inner cylinder fitting 20 and the elastic body 28 is regulated by forming the inner cylinder fitting 20 with a flange 26, and forming the rubber stopper 176 on the flange 26.

[Patent Document 1] Japanese Patent Unexamined Publication No. 9-89037

DISCLOSURE OF THE INVENTION

Problem that the Invention is to Solve

However, in the above-described conventional rebound stopper mechanism 170, the inner cylinder fitting 20 is formed with the flange 26. Thus, the manufacturing cost of the inner cylinder fitting 20 is high. Further, since the flange 26 in the -Z direction of the elastic body 28 is arranged, it is impossible to split a mould of the elastic body 28 in the Z direction. As a result, the manufacturing process becomes complicated, and the manufacturing cost is high.

The present invention was made in light of these problems and an object thereof is to provide a vibration-proofing device which can regulate the displacement of an elastic body at low cost.

Means for Solving the Problem

The present invention adopts the following means in order to solve the above problems.

The vibration-proofing device according to the present invention is a vibration-proofing device including a first member connected to a vibration receiving portion and formed in a substantially cylindrical shape, a second member connected to a vibration generating portion and disposed on the inner peripheral side of the first member, an elastic body which elastically connects the first member and the second member, a plurality of liquid chambers disposed around the central axis of the second member, and a partition wall made of the elastic body, which is disposed between the adjacent liquid chambers. An initial load is input substantially parallel to the central axis of the second member. When the second member has been displaced in a direction opposite to the input direction of the initial load, a displacement regulating member which abuts a formation area of the partition wall in the elastic body to regulate the displacement of the elastic body is connected to the first member.

According to this configuration, the displacement regulating member which abuts the formation area of the partition wall in the elastic body to regulate the displacement of the elastic body is connected to the first member. Thus, it is not necessary to form the rigid member connected to the second member. Accordingly, the displacement of the elastic body can be regulated at low cost.

Preferably, convex portions made of the elastic body are formed in the formation area of the partition wall in the surface of the elastic body in the direction opposite to the input direction of the initial load, and when the second member has been displaced in the direction opposite to the input direction of the initial load, the convex portions abut the displacement regulating member.

Advantage of the Invention

According to this configuration, since the convex portions of the elastic body are made to abut the displacement regulating member, the spring constant of the vibration-proofing device can be prevented from abruptly increasing due to the abutment.

According to the present invention, the vibration-proofing device which can regulate the displacement of the elastic body can be provided at low cost, without forming the rigid member connected to the second member.

DESCRIPTION OF REFERENCE NUMERALS AND SIGNS

Figure 1:
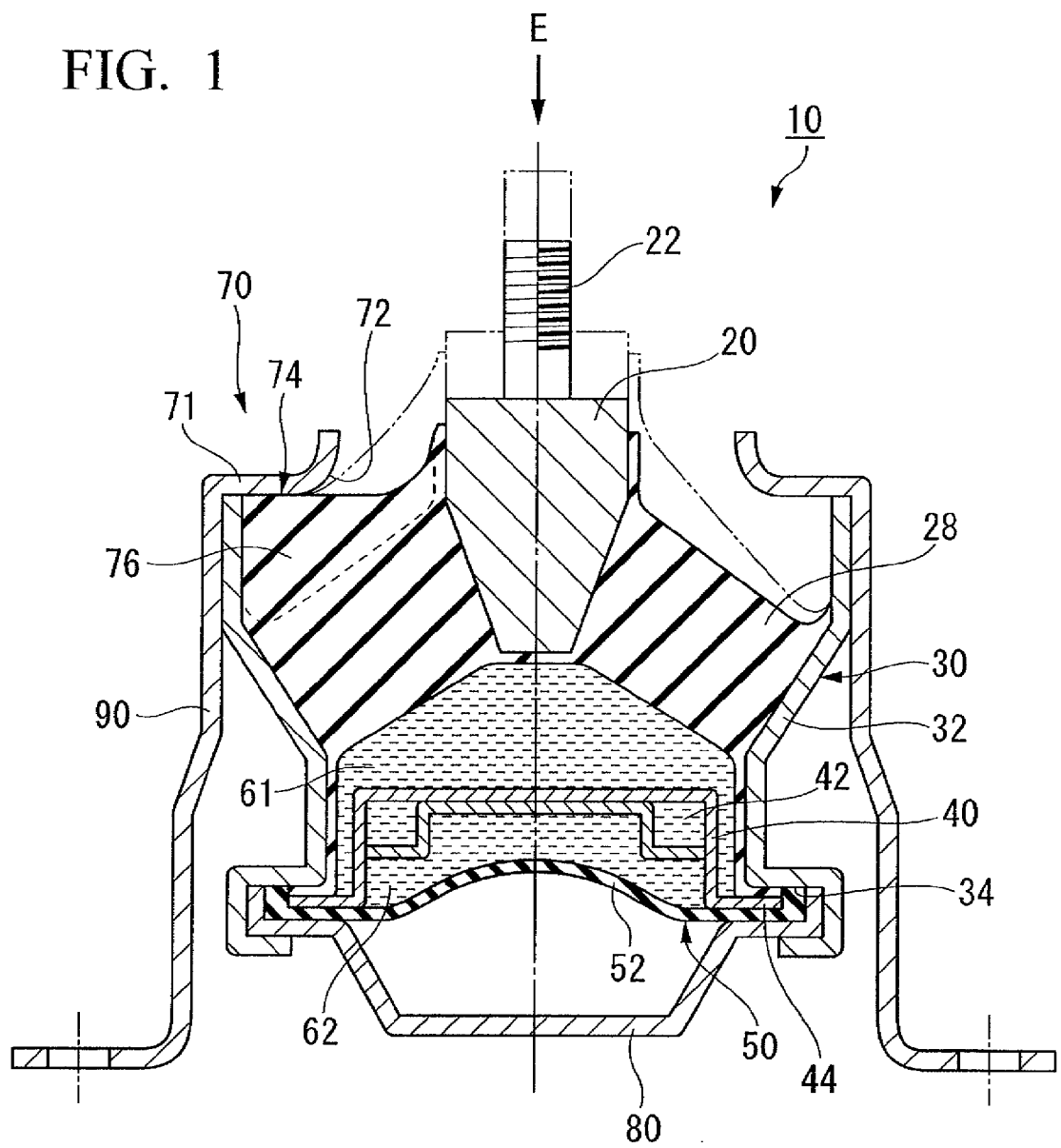
FIG. 1 is a side sectional view of a vibration-proofing device according to a reference technique.

10 AND 12: Engine mount (Vibration-proofing device)
20: Inner cylinder fitting (second member)
28: Elastic body 29: Partition wall
30: Outer cylinder fitting (first member)
71: Displacement regulating member
74: Abutting portion
76: Convex portion
130: Intermediate cylinder fitting (second member)
161: First liquid chamber
162: Second liquid chamber

BEST MODE FOR CARRYING OUT THE INVENTION

Hereinafter, the reference technique and embodiment of a vibration-proofing device according to the present invention will be described with reference to the drawings.

(Reference Technique)

Figure 2:
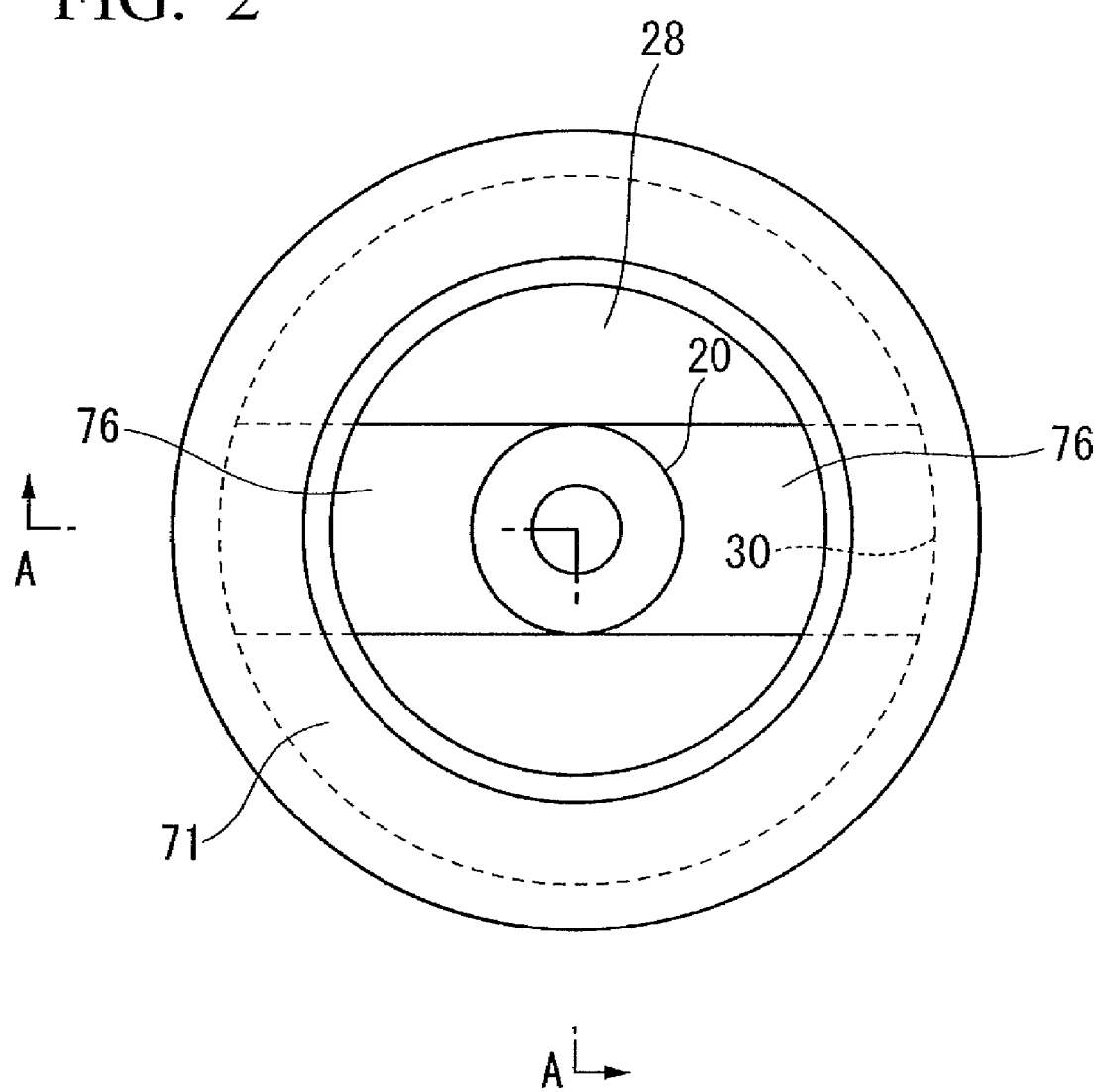
FIG. 2 is a plan view of the vibration-proofing device according to the reference technique.

FIG. 1 is an explanatory view of the vibration-proofing device according to the reference technique, and is a side sectional view in the line A-A of FIG. 2. In this reference technique, a polar coordinate system is set in the vibration-proofing device, a downward direction parallel to the central axis of the vibration-proofing device is defined as a +Z direction, and a radial direction which vertically extends from the central axis is defined as a +R direction. As shown in FIG. 1, the vibration-proofing device according to the reference technique is an engine mount 10. The engine mount 10 has an elastic body 28 which connects an outer cylinder fitting (first member) 30 and an inner cylinder fitting (second member) 20, a plurality of convex portions 76 which is formed to protrude in the −Z direction from the elastic body 28, and a displacement regulating member 71 which abuts the convex portions 76 to regulate the displacement of the elastic body 28.

The engine mount 10 includes the inner cylinder fitting 20 connected to an engine (vibration generating portion). The inner cylinder fitting 20 is injection-molded using an Al material, or the like. A bolt 22 is erected from a −Z-side end of the inner cylinder fitting 20, so that the inner cylinder fitting 20 can be connected to the engine. A +Z-side end of the inner cylinder fitting 20 is formed in the shape of a truncated cone, and the side surface of the inner cylinder fitting is formed as a tapered surface.

The engine mount 10 includes the outer cylinder fitting 30 connected to a vehicle body (vibration receiving portion) via a bracket 90. The above-described inner cylinder fitting 20 is disposed in the vicinity of the −Z-direction inside the outer cylinder fitting 30, which is formed in a substantially cylindrical shape. The axial intermediate portion of the outer cylinder fitting 30 is increased in diameter in the −Z-direction from the +Z-direction, and the inner surface of the outer cylinder fitting is formed as a tapered surface.

Between the tapered surface of the inner cylinder fitting 20 and the tapered surface of the outer cylinder fitting 30, the elastic body 28 which connects both elastically is formed. The elastic body 28 is made of a rubber material, or the like, and is vulcanized and adhered to the inner cylinder fitting 20 and the outer cylinder fitting 30. This forms the engine mount 10 which has a desired static spring constant.

Meanwhile, an orifice member 40 is inserted into the inside of the outer cylinder fitting 30. The orifice member 40 is formed with a ring-shaped orifice passage 42. Further, a flange portion 44 is formed at the +Z-side end of the orifice member 40. A diaphragm member 50 is disposed on the +Z-side of the orifice member 40. The diaphragm member 50 is formed from a flexible rubber elastic film 52. A lid member 80 is disposed on the +Z-side of the diaphragm member 50.

The +Z-side end of the outer cylinder fitting 30 is increased in diameter, and a lower seating surface 34 is formed between a large-diameter portion and a small-diameter portion of the outer cylinder fitting. The flange portion 44 of the orifice member 40, the peripheral edge of the diaphragm member 50, and the peripheral edge of the lid member 80 are superposed in order on the lower seating surface 34. The +Z-side end of the outer cylinder fitting 30 is caulked toward the central axis, and the orifice member 40, the diaphragm member 50, and the lid member 80 are fixed.

A liquid is enclosed inside the engine mount 10. A main liquid chamber 61 is formed between the elastic body 28 and the orifice member 40, and a sub-liquid chamber 62 is formed between the orifice member 40 and the diaphragm member 50. One end of the orifice passage 42 is opened to the main liquid chamber 61, and the other end thereof is opened to the sub-liquid chamber 62.

In the above-described engine mount 10, the initial load by the engine's own weight is input in the +Z-direction parallel to the central axis of the outer cylinder fitting 30. When the initial load is input to the inner cylinder fitting 20, the inner cylinder fitting is displaced in the +Z-direction. When the engine vibrates in this state, the inner cylinder fitting 20 vibrates in the ±Z-direction. Then, the liquid of the main liquid chamber 61 flows into the sub-liquid chamber 62 through the orifice passage 42, and the liquid of the sub-liquid chamber 62 flows into the main liquid chamber 61 through the orifice passage 42. Then, when the inner cylinder fitting 20 vibrates at a predetermined frequency, the liquid of the orifice passage 42 causes liquid column resonance, generating a large damping force. This suppresses the transmission of the vibration to the vehicle body side from the engine side.

The cylindrical bracket 90 is anchored to the outer peripheral surface of the outer cylinder fitting 30 by welding, or the like. The bracket 90 extends in the +Z-direction, and a portion of the tip thereof is bent radially outward. The bent portion is formed with a through hole for fastening. The engine mount 10 is attached to the vehicle body by inserting a bolt, or the like, into the through hole.

(Rebound Stopper Mechanism)

The engine mount 10 according to the reference technique includes a rebound stopper mechanism 70.

The rebound stopper mechanism 70 includes the displacement regulating member 71 which abuts the elastic body 28 to regulate the displacement of the elastic body 28 when the inner cylinder fitting 20 has been displaced in the −Z-direction. In this reference technique, a −Z-side end of the bracket 90 functions as the displacement regulating member 71. That is, the −Z-side end of the bracket 90 is bent in a −R direction (central axis direction) on the −Z-side of the outer cylinder fitting 30 to form the displacement regulating member 71. In addition, a −R-side end of the displacement regulating member 71 is further bent in the −Z-direction to form a circular-arc portion 72 outside the corner thereof.

Meanwhile, a −Z-side surface of the elastic body 28 is formed in a tapered shape from the outer cylinder fitting 30 to the inner cylinder fitting 20. The convex portions 76 are formed in the −Z-direction from the −Z-side surface of the elastic body 28.

The convex portions 76 are formed up to the −Z-side end of the outer cylinder fitting 30 along the inner surface of the outer cylinder fitting 30. The −Z-side surfaces of the convex portions 76 extend substantially horizontally toward the inner cylinder fitting 20 from the −Z-side end of the outer cylinder fitting 30.

FIG. 2 is a plan view of the vibration-proofing device according to the reference technique, and is a view when FIG. 1 is seen from the direction of an arrow E.

As shown in FIG. 2, a plurality of convex portions 76 is provided in a peripheral direction of the elastic body 28. In this reference technique, two convex portions 76 and 76 are formed at regular intervals of 180°. Each convex portion 76 is formed with substantially the same width from the inner surface of the outer cylinder fitting 30 to the side surface of the inner cylinder fitting 20.

Next, the operation of the vibration-proofing device according to the reference technique will be described.

During acceleration or deceleration of a vehicle, the engine rotates (pitches) about an output shaft. Accordingly, as shown by a two-dot chain line in FIG. 1, the inner cylinder fitting 20 is displaced in the −Z-direction. In this case, the elastic body 28, which is vulcanized and adhered to the inner cylinder fitting 20, is also displaced in the −Z-direction. In addition, the amount of displacement of the elastic body 28 in the −Z-direction increases linearly from the outer cylinder fitting 30 to the inner cylinder fitting 20.

In this reference technique, the displacement regulating member 71 is provided in the −Z-direction of the elastic body 28. When the elastic body 28 has been displaced in the −Z-direction, the displacement regulating member 71 abuts the convex portions 76 erected from the elastic body 28 at an abutting portion 74. This can suppress the displacement of the elastic body 28 and the inner cylinder fitting 20 in the −Z-direction. Accordingly, the tensile stress which acts on the elastic body 28 can be reduced, and the durability of the elastic body 28 can be improved.

In addition, the −R-side end of the displacement regulating member 71 is formed with the circular-arc portion 72. Therefore, stress concentration can be prevented from occurring in the elastic body 28 which has abutted on the −R-side end of the displacement regulating member 71. This can improve the durability of the elastic body 28.

Figure 5:
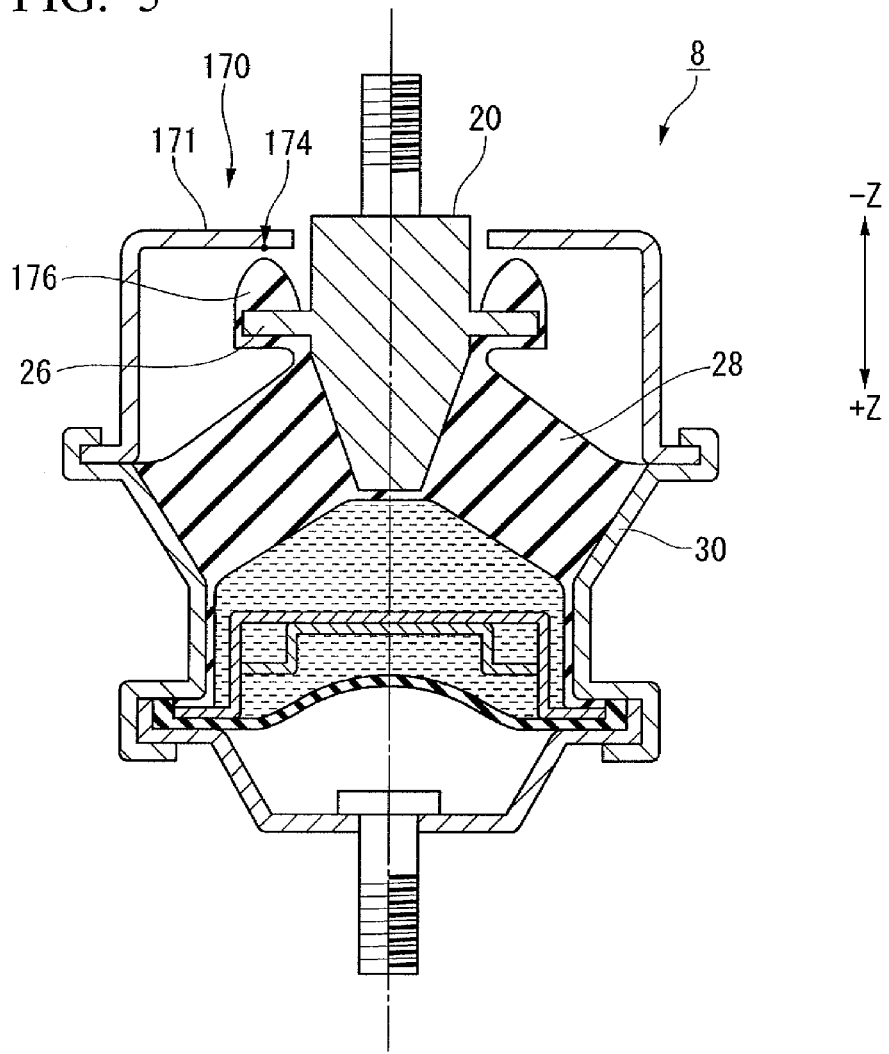
FIG. 5 is a side sectional view of a vibration-proofing device according to a conventional technique.

Meanwhile, in the rebound stopper mechanism 170 of the conventional technique shown in FIG. 5, the flange 26 is formed to overhang from the inner cylinder fitting 20 in the +Z-direction of the abutting portion 174 between the rubber stopper 176 and the displacement regulating member 171. Since the flange 26 interferes with the displacement regulating member 171, the −Z-direction displacement of the inner cylinder fitting 20 and the elastic body 28 is strictly regulated.

On the other hand, in the rebound stopper mechanism 70 of the reference technique shown in FIG. 1, a rigid member, such as the flange connected to the inner cylinder fitting 20, is not connected in the +Z-direction of the abutting portion 74. In addition, the rigid member is a member made of a high-rigidity metallic material or the like from the elastic body 28. Even in this case, as described above, the −Z-direction displacement of the elastic body 28 can be suppressed. Moreover, since a rigid member connected to the inner cylinder fitting 20 is not formed, the manufacturing cost can be reduced. Further, the mould of the elastic body 28 can be split into the Z-direction. This can provide the vibration-proofing device which can regulate the displacement of the inner cylinder fitting at low cost.

Further, since the convex portions 76 of the elastic body 28 are made to abut the displacement regulating member 71, the spring constant of the engine mount can be prevented from abruptly increasing due to the abutment. In addition, it is also possible to adjust the rate of increase of the spring constant by adjusting the shape and number of the convex portions 76.

(Embodiment)

Figure 3:
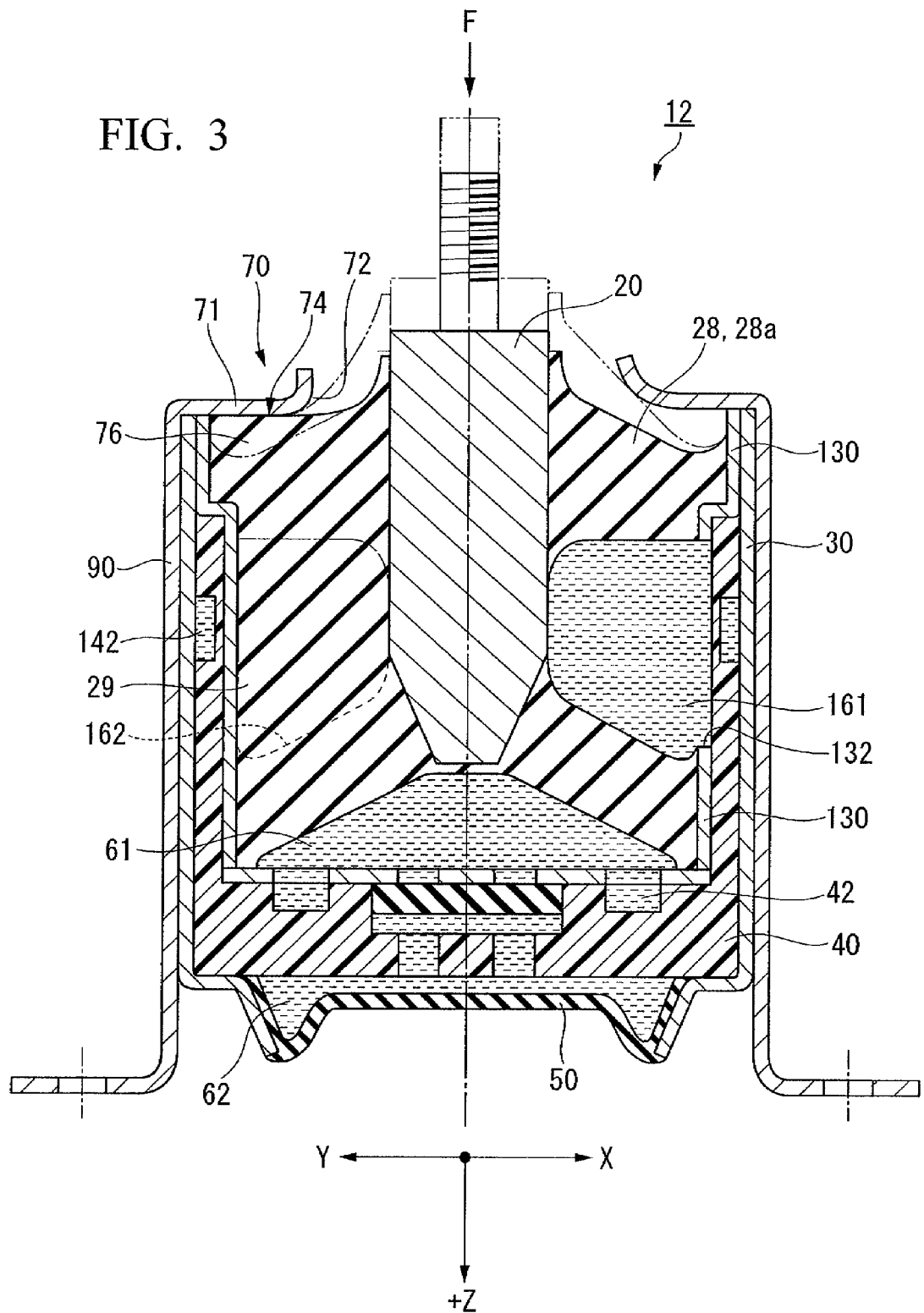
FIG. 3 is a side sectional view of a vibration-proofing device according to an embodiment.
Figure 4:
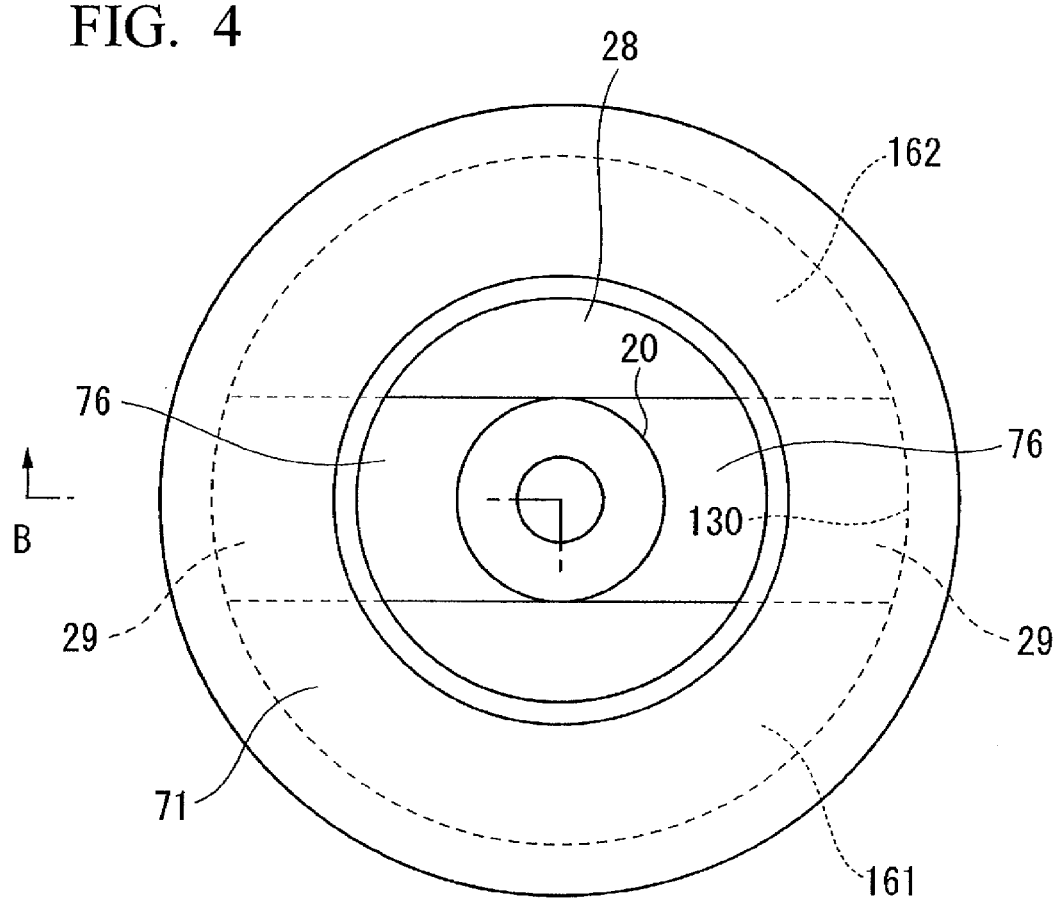
FIG. 4 is a plan view of the vibration-proofing device according to the embodiment.

FIG. 3 is an explanatory view of a vibration-proofing device according to an embodiment, and is a side sectional view in the line B-B of FIG. 4. In this embodiment, an orthogonal coordinate system is set in the vibration-proofing device, a downward direction of a vehicle parallel to the central axis of the vibration-proofing device is defined as a +Z-direction, a front direction of the vehicle orthogonal to the central axis is defined as an +X-direction, and a right direction of the vehicle orthogonal to the central axis is defined as a +Y-direction. As shown in FIG. 3, the vibration-proofing device according to the embodiment is an engine mount 12. Although the engine mount of the reference technique exhibits a damping force only against the vibration in the Z-direction of the engine, the engine mount 12 of the embodiment also exhibits a damping force against the vibration in the X-direction in addition to the vibration in the Z-direction. In addition, as for portions having the same configurations as the reference technique, a detailed description thereof is omitted.

The engine mount 12 has an intermediate cylinder fitting 130 inside the outer cylinder fitting 30. The intermediate cylinder fitting 130 and the inner cylinder fitting 20 are connected together by the elastic body 28. On the other hand, a +Z-side opening of the outer cylinder fitting 30 is covered with a rubber elastic film, whereby a diaphragm 50 is formed. The orifice member 40 is disposed between the elastic body 28 and the diaphragm 50.

A liquid is enclosed inside the engine mount 12. A main liquid chamber 61 is formed between the elastic body 28 and the orifice member 40, and a sub-liquid chamber 62 is formed between the orifice member 40 and the diaphragm 50. The orifice member 40 is formed with a first orifice passage 42. One end of the orifice member is opened to the main liquid chamber 61, and the other end thereof is opened to the sub-liquid chamber 62.

When the inner cylinder fitting 20 vibrates in the ±Z-direction with the main vibration of the engine, the liquid of the main liquid chamber 61 flows into the sub-liquid chamber 62 through the first orifice passage 42, and the liquid of the sub-liquid chamber 62 flows into the main liquid chamber 61 through the first orifice passage 42. Then, when the inner cylinder fitting 20 vibrates at a predetermined frequency, the liquid of the first orifice passage 42 causes liquid column resonance. This can exhibit a large damping force against the Z-direction vibration of the engine.

On the other hand, window portions 132 are respectively formed in the side surfaces of the intermediate cylinder fitting 130 in the ±X-direction. The elastic body 28 is disposed between a non-formation region of each window portion 132 in the intermediate cylinder fitting 130 and the inner cylinder fitting 20. In addition, a concave portion is formed between a formation area of each window portion 132 in the intermediate cylinder fitting 130 and the inner cylinder fitting 20. The concave portions in the ±X-direction are filled with a liquid, whereby a first liquid chamber 161 and a second liquid chamber 162 are formed around the central axis of the inner cylinder fitting 20. A partition wall 29 formed from the elastic body 28 is disposed between the first liquid chamber 161 and the second liquid chamber 162.

The orifice member 40 also extends between the side surface of the intermediate cylinder fitting 130, and the inner surface of the outer cylinder fitting 30. The orifice member 40 is formed with a second orifice passage 142. One end of the orifice member is opened to the first liquid chamber 161, and the other end thereof is opened to the second liquid chamber 162.

Meanwhile, vibrations (main vibrations) generated from a piston reciprocating in the engine are input to the engine mount from the engine, other vibrations (sub-vibrations) generated by a change in the rotating speed of a crankshaft in the engine also exist. The main vibration is often generated in the Z-direction (vehicle up-down direction), and the sub-vibration is often generated in the X-direction (front-back direction of the vehicle). The engine mount 12 of this embodiment exhibits a damping force against the main vibration by the first above-described orifice passage 42, and exhibits a damping force against the sub-vibration by the second orifice passage 142.

That is, when the inner cylinder fitting 20 vibrates in the ±X direction with the sub-vibration of the engine, the liquid of the first liquid chamber 161 flows into the second liquid chamber 162 through the second orifice passage 142, and the liquid of the second liquid chamber 162 flows into the first liquid chamber 161 through the second orifice passage 142. Then, when the inner cylinder fitting 20 vibrates at a predetermined frequency, the liquid of the second orifice passage 142 causes liquid column resonance. This can exhibit a large damping force against the X-direction vibration of the engine.

In addition, when the sub-vibration of the engine is generated in the Y-direction (right-left direction of a vehicle), it is only necessary to dispose the first liquid chamber 161 and the second liquid chamber 162 in the ±Y directions. Further, (a total of four) liquid chambers may be formed in the ±X direction and the ±Y direction, respectively, so that a damping force is exhibited against the vibration in all the directions of the engine.

Further, a third orifice passage which communicates the first liquid chamber 161 and the second liquid chamber 162, and the sub-liquid chamber 62 may be formed in the orifice member 40. In this case, the damping force against the main vibration of the engine can be exhibited by the first orifice passage 42 and the third orifice passage. Moreover, if the resonant frequencies of the first orifice passage 42 and the third orifice passage are set to different values, it is possible to exhibit a damping force in a wide frequency range.

(Rebound Stopper Structure)

The engine mount 12 according to the embodiment includes the rebound stopper mechanism 70.

The rebound stopper mechanism 70 includes the displacement regulating member 71 which abuts the elastic body 28 to regulate the displacement of the elastic body 28 when the inner cylinder fitting 20 has been displaced in the −Z-direction. In this embodiment, a −Z-side end of the bracket 90 functions as the displacement regulating member 71. That is, the −Z-side end of the bracket 90 is bent toward the inner cylinder fitting 20 on the −Z-side of the outer cylinder fitting 30 (and the intermediate cylinder fitting 130) to form the displacement regulating member 71. In addition, an inner-cylinder-side end of the displacement regulating member 71 is further bent in the −Z-direction to form a circular-arc portion 72 outside the corner thereof.

Meanwhile, a −Z-side surface of the elastic body 28 is formed in a tapered shape from the intermediate cylinder fitting 130 to the inner cylinder fitting 20. The convex portions 76 are formed in the −Z-direction from the −Z-side surface of the elastic body 28. The convex portions 76 are formed up to the −Z-side end of the intermediate cylinder fitting 130 along the inner surface of the intermediate cylinder fitting 130. The −Z-side surfaces of the convex portions 76 extend substantially horizontally toward the inner cylinder fitting 20 from the −Z-side end of the intermediate cylinder fitting 130.

FIG. 4 is a plan view of the engine mount according to this embodiment, and is a view when FIG. 3 is seen from the direction of an arrow F.

As shown in FIG. 4, a plurality of convex portions 76 formed from the elastic body 28 is formed in the −Z-direction from the −Z-side surface of the elastic body 28. In this embodiment, two convex portions 76 and 76 are formed at regular intervals of 180°. Each convex portion 76 is formed with substantially the same width from the inner surface of the intermediate cylinder fitting 130 to the side surface of the inner cylinder fitting 20. In addition, in this embodiment, in plan view, the convex portions 76 and 76 are formed in the formation area of the partition wall 29 disposed between the first liquid chamber 161 and the second liquid chamber 162.

Next, the operation of the vibration-proofing device according to this embodiment will be described.

As shown by a two-dot chain line in FIG. 3, when the inner cylinder fitting 20 displaces in the −Z-direction, the elastic body 28 which is vulcanized and adhered to the inner cylinder fitting 20 is also displaced in the −Z-direction. In addition, the amount of displacement of the elastic body 28 in the −Z-direction increases linearly from the intermediate cylinder fitting 130 to the inner cylinder fitting 20.

Here, in this embodiment, the displacement regulating member 71 is provided in the −Z-direction of the elastic body 28.

When the elastic body 28 has been displaced in the −Z-direction, the displacement regulating member 71 abuts the convex portions 76 erected from the elastic body 28 at an abutting portion 74. This can suppress the displacement of the elastic body 28 and the inner cylinder fitting 20 in the −Z-direction. Accordingly, the tensile stress which acts on the elastic body 28 can be reduced, and the durability of the elastic body 28 can be improved.

In addition, even in this embodiment, similarly to the rebound stopper mechanism 170 of the conventional technique shown in FIG. 5, it is considered that a rigid member, such as the flange 26 connected to the inner cylinder fitting 20, is disposed in the +Z-direction of the abutting portion 174 between the rubber stopper 176 and the displacement regulating member 171. However, when the flange 26 is formed in the −Z-direction of the elastic body 28, it is impossible to split the mould of the elastic body 28 in the Z-direction. In this case, it is necessary to split the mould in the horizontal direction, and there is a problem that the manufacturing process is complicated.

Thus, since the mould of the elastic body 28 is split in the vertical direction, it is possible to bury the flange 26 inside the elastic body 28 in the +Z-direction of the abutting portion 174. However, when the flange is buried by the elastic body 28a, which constitutes a side wall in the −Z-direction of the first liquid chamber 161 shown in FIG. 3, the damping property of the engine mount 12 is greatly influenced.

Further, in order to split the mould of the elastic body 28 in the vertical direction, it is also considered that the rubber stopper is formed in a rigid member separate from the inner cylinder fitting 20, and the rigid member is connected to the inner cylinder fitting 20. However, in this case, since the number of parts increases, the manufacturing cost increases.

In the rebound stopper mechanism 70 of this embodiment, a rigid member connected to the inner cylinder fitting 20 is not connected in the +Z-direction of the abutting portion 74. Even in this case, as described above, the displacement of the elastic body 28 in the −Z-direction can be suppressed. Moreover, since the rigid member connected to the inner cylinder fitting 20 is not formed, it is possible to split the mould of the elastic body 28 in the Z-direction, and it is possible to reduce the number of parts. As a result, the manufacturing cost can be reduced. Accordingly, the vibration-proofing device which can regulate the displacement of the inner cylinder fitting at low cost can be provided.

It should be understood that the technical scope of the present invention is not limited to the above-described embodiment, but that various modifications of the above-described embodiment may be made without departing from the spirit and scope of the invention. That is, the specific materials and configurations as set forth in the embodiment are no more than examples and can be appropriately changed.

For example, the structure of the liquid-enclosed engine mount in the above embodiment is just an example, and other structures can be adopted.

Further, although the configuration in which a plurality of convex portions erected from the elastic body is made to abut the displacement regulating member has been described in the above embodiment, the whole periphery of the elastic body may be made to abut the displacement regulating member without forming the convex portions.

Industrial Applicability

In the vibration-proofing device of the present invention, the displacement regulating member which abuts the formation area of the partition wall in the elastic body to regulate the displacement of the elastic body is connected to the first member. Thus, the displacement of the elastic body can be regulated at low cost without the need of forming the rigid member connected to the second member.

What is claimed is:

1. A vibration-proofing device comprising:
a first member connected to a vibration receiving portion and formed in a substantially cylindrical shape;
a second member connected to a vibration generating portion and disposed on the inner peripheral side of the first member;
an elastic body which elastically connects the first member and the second member;
an equilibrium chamber and a diaphragm disposed on the inner peripheral side of the first member, wherein the equilibrium chamber is disposed between the elastic body and the diaphragm;
a plurality of liquid chambers disposed around the central axis of the second member; and
a partition wall made of the elastic body, which is disposed between the adjacent liquid chambers, the initial load being input substantially parallel to the central axis of the second member,
wherein, when the second member has been displaced in a direction opposite to the input direction of the initial load, a displacement regulating member which abuts a formation area of the partition wall in the elastic body to regulate the displacement of the elastic body is connected to the first member.

2. The vibration-proofing device according to claim 1, wherein convex portions made of the elastic body are formed in the formation area of the partition wall in the surface of the elastic body in the direction opposite to the input direction of the initial load, and when the second member has been displaced in the direction opposite to the input direction of the initial load, the convex portions abut the displacement regulating member.

* * * * *